United States Patent [19]
Honsberg et al.

[11] Patent Number: 5,841,030
[45] Date of Patent: Nov. 24, 1998

[54] PROCESS FOR THE DETERMINING THE VIBRATION CHARACTERISTICS OF A BODY

[75] Inventors: Wolfram Honsberg, Dorfen; Raymond Freymann, Munich; Franz Winter, Mainz; Hans Steinbichler, Neubeuern, all of Germany

[73] Assignee: Bayerische Motoren Werke Aktiengesellschaft, Munich, Germany

[21] Appl. No.: 776,671
[22] PCT Filed: Jun. 14, 1995
[86] PCT No.: PCT/EP95/02316
 § 371 Date: Apr. 14, 1997
 § 102(e) Date: Apr. 14, 1997
[87] PCT Pub. No.: WO96/04532
 PCT Pub. Date: Feb. 15, 1996

[30] Foreign Application Priority Data

Aug. 4, 1994 [DE] Germany ............... 44 27 692.3

[51] Int. Cl.$^6$ .................. G01B 9/00; G01H 9/00
[52] U.S. Cl. .................. 73/579; 73/655; 73/656; 364/508; 356/349; 356/351
[58] Field of Search .............. 73/579, 655, 656; 364/508; 356/349, 351, 358

[56] References Cited

U.S. PATENT DOCUMENTS

| | | | |
|---|---|---|---|
| 3,604,253 | 9/1971 | Kersch | 73/579 |
| 3,899,921 | 8/1975 | Hockley | 73/579 |
| 4,913,550 | 4/1990 | Montgomery et al. | 356/354 |

OTHER PUBLICATIONS

"Schwingungsformanalyse Mit Holografischer Interferometric Und Modalanalyse" by. M. Week, H. ostendorp, and M. sellhorst Technisches messen JM 1982–1988, Bal 60, No. 6 Jun. 1993.

"Measurement of the Longitudinal and transverse Vibration frequencies of a Rod by speckle Interferometry" by A. Bayón, F. gascón, and A. Varadé. (May, 1993) IEEE Transactions on Ultrasonics Feroelectrics and Frequency Control, No. 3, New York.

Primary Examiner—Christine K. Oda
Assistant Examiner—Rose M. Miller
Attorney, Agent, or Firm—Evenson, McKeown, Edwards & Lenahan P.L.L.C

[57] ABSTRACT

A process is disclosed for determining the vibration characteristics of a body by modal analysis. The body is made to vibrate at different frequencies and optical interference images of the body are recorded for the different frequencies. The interference images are analyzed on the basis of a mathematical/physical model, in view of the vibration characteristics at predetermined points, and the thus obtained information about the vibration characteristics of said points is subjected to a modal analysis.

9 Claims, 1 Drawing Sheet

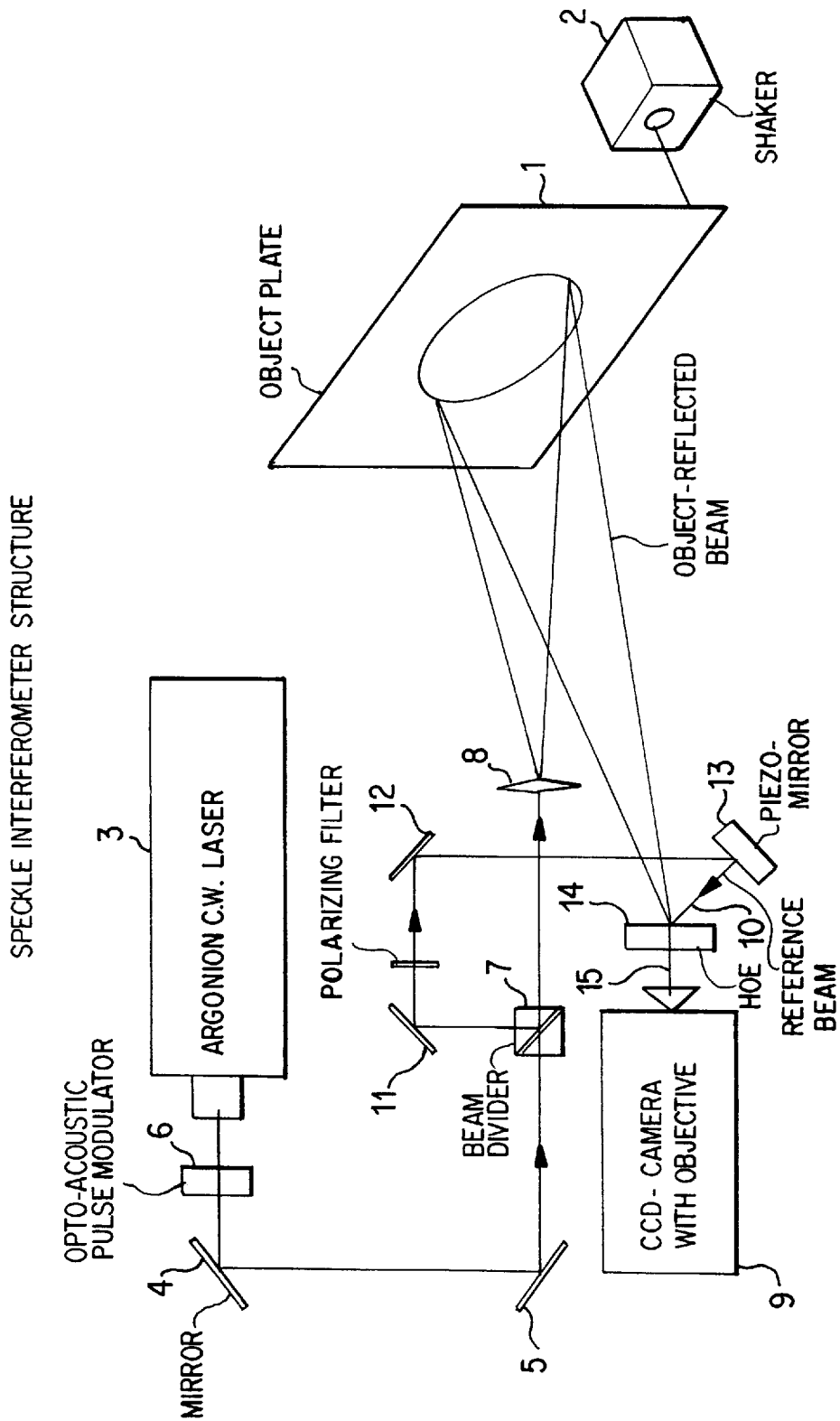

PROCESS FOR THE DETERMINING THE VIBRATION CHARACTERISTICS OF A BODY

BACKGROUND AND SUMMARY OF THE INVENTION

The invention relates to a process for determining the vibration characteristics of a body by modal analysis.

During a modal analysis, the dynamic structural response of the body to an external excitation is determined at defined points of the body. For this purpose, acceleration sensors are mounted at these points, whose output signal supplies information on the acceleration of the body at the respective points in at least one acceleration direction. Computing processes which follow permit the supplying of information on the vibration characteristics of the body for the respective excitation frequency and permit, for example, the determination of the modal parameters of the vibration system. The parameters are: the natural frequencies, natural shapes, generalized masses and modal dampings.

If the vibration characteristics of a complex body are to be determined, this requires a relatively large number of sensors at a correspondingly large number of measuring points. Since the sensors and the pertaining transmission elements for the measuring signal, as a rule electric lines, themselves have a mass and a stiffness, this results in a change of the vibration characteristics which becomes even larger as more measuring points are provided and as the body to be measured becomes lighter. The modal analysis therefore reaches the limits of its usage range.

It is an object of the invention to provide a process of the above-mentioned type by which it is possible to carry out modal analysis for a virtually unlimited number of measuring points of the body.

The invention achieves this object by a process for determining the vibration characteristics of a body by modal analysis, wherein the body is excited to carry out vibrations and, at one viewing angle, several optical interference images of the body are recorded. On the basis of a mathematical/physical model, the interference images are analyzed with respect to the vibration characteristics existing at predetermined points. The thus obtained information on the vibration characteristics of these points is subjected to the modal analysis.

The vibration characteristics are determined optically by means of interference images. This determination takes place without any impairment of the body itself, particularly without an application of any measured value sensors.

In contrast to obtaining only one optical interference image by which the vibration form and amplitude of the structure is determined for a defined excitation frequency, the interference images in this case are used as measuring data for adapting the parameters of a mathematical/physical model by which the characteristics of the object are described as a system. This model is derived from the known fundamental equation for the dynamic forces of a linear, time-invariant, elastomechanical multi-freedom degree system which can be affected by arbitrary external forces. It is assumed that this structure with N discrete degrees of freedom can be described by an oscillator chain with N modal, decoupled degrees of freedom.

From the transmission characteristics between the vibrations of the bodies at the different points determined from the interference images and the excitation power, the modal parameters of the body can then be at least partially determined by way of modal-analytic evaluations.

The invention can be practically developed in various ways. The (coherent) laser technique is preferred for obtaining the interference images. As a result, it is possible to detect vibrations if the vibration amplitude is larger than half the wave length of the laser. As an alternative, it is possible to obtain the interference image by means of a Moiré process.

When coherent light is used, each interference image itself can be obtained in a different fashion. A hologram in the form of, for example, a double or multiple-pulse hologram is preferred which can be correspondingly reconstructed for the analysis.

Instead of a hologram, holographic interferometry or laser Doppler vibrometry may also be used to obtain the interference image. In the case of the holographic interferometry, (all) vibration characteristics of the body are recorded at a defined point in time in the form of optical interference images. In the case of the laser Doppler vibrometry, the vibration characteristics of the body are recorded in the form of the speed distribution on its surface, in which case the speed measurement takes place by way of the frequency shift of a monochromatic laser light beam (Doppler effect). Matured image processing programs exist for all of the above-mentioned processes.

It is particularly important within the scope of the invention to determine by means of a stroboscopic illumination and taking of the interference image in two different vibration conditions, phases with respect to a reference phase (such as power or acceleration). With the use of this phase measurement, the mathematical/physical model makes it possible to assign to each image point the amplitude and the phase, or the real and imaginary part, and thus to completely determine the physical parameters for the vibration characteristics of each individual image point.

For a detailed investigation of the body over a frequency range which is of interest, it is required that the process according to the invention be used for different excitation frequencies of the body. These may be discrete frequencies which are independent of one another or frequencies which have a defined equal frequency separation from one another. It will then be possible to determine the modal parameters of the body on the basis of the modal analysis. Finally, the possibility should be mentioned of exciting the body stochastically and to generate interference images on this basis which, as described above, can then form the basis of the modal analysis.

The modal analysis requires that the experimental determination of the vibration characteristics of the body takes place in a defined manner so that the transmission characteristics between the (optically) determined body vibrations and the external body excitation can be determined. These transmission characteristics can be indicated, for example, in the frequency range, in the form of frequency response curves but also in the time range, in the form of time-related decay curves or transient transmission curves.

These experimentally determined transmission characteristics of the body form the basis of the computing process which follows, by the use of which the modal structural parameters of the body can be numerically determined. The mathematical model on which this computing process is based generally contains the movement equations of a linear, time-invariant, elastomechanical system with several degrees of freedom, and is affected by an external excitation.

The invention will be further explained by means of an embodiment illustrated in the drawing.

BRIEF DESCRIPTION OF THE DRAWINGS

The single FIGURE schematically shows the construction of a system by which the process according to the invention for determining the vibration characteristics of a body is carried out.

DETAILED DESCRIPTION OF THE DRAWINGS

Referring to the FIGURE, the body is a metal plate 1 which is excited by means of a shaker 2 with a defined frequency of, for example, 100 Hz. The shaker 2 is applied to a corner of the plate 1.

For obtaining an interference image of the vibration form to be imaged in the plate, the plate 1 is illuminated by means of an argon ion c.w. laser 3. Two deviating mirrors 4 and 5, an opto-acoustic modulator 6, a beam divider 7 and an illumination lens system (which is illustrated schematically as a lens 8) are situated in the beam path of the laser 3. For taking the interference image, a camera 9 is used which is supplied by means of a suitable lens system with the image of the plate together with a reference beam 10 which is obtained by means of the beam divider 7 as well as additional deviating mirrors 11 and 12 and a piezo mirror 13. The reference beam 10 is axially faded into the object-reflected beam 15 by way of a holographic-optical element 14.

The starting point of the computerized analysis is the interference band pattern whose brightness control is recorded by means of the camera 9. The intensity of this pattern is described in a simplified manner by the following equation:

$$I_k(x) = a(x) * (1 + m(x)) * \cos[\phi(x) + \Psi_k] = 1, 2, 3$$

wherein x=position vector which indicates the individual image point;

a(x)=local median intensity;

m(x)=band contrast; and $\Psi_k$=a relative fixed phase.

The physically relevant quantity—the interference phase $\phi(x)$—must be determined independently of a(x) and m(x) at an arbitrary image point x. For the determination of the interference phase, the phase shifting process is used here, for example. All three unknown quantities a(x), m(x) and $\phi(x)$ of the above-mentioned equation can be determined from three values I(x).

For obtaining these three values, the relative interference phase is shifted by means of an optical path length change. The piezo mirror 13 is used for this purpose. In this case, the deviation of the mirror 13 by half a laser wave length corresponds to a phase change by $2\pi$. Since the laser wave length is known, the deviation of the object at the respective image point can be calculated therefrom.

For examining selected vibration conditions, a stroboscopic illumination of the object 1 is chosen. For this purpose, the continuous laser beam is pulsed by means of the modulator 6. The pulse frequency at which the modulator 6 is operated is synchronized with the excitation frequency of the object 1, that is, the output frequency of the shaker 2. Thus, the stroboscopic illumination of the object 1 takes place synchronously with its excitation frequency.

In order to be able to compute the real and imaginary part of the vibration with respect to the generating power of each image point, it is expedient to record at least two interference images of mutually different vibration conditions. With the assumption that the vibration of each image point takes place at the excitation frequency, the amplitude and the phase of the vibration of the image point can then be determined from the two momentary deviation values.

The real and imaginary parts of the deformation in a given point P with reference to the excitation power are $$Re(\chi_P(\omega)) = \frac{\chi_P(t_2)\sin(\omega t_2) - \chi_P(t_1)\sin(\omega t_2)}{\sin(\omega t_1)\cos(\omega t_2) - \sin(\omega t_2)\cos(\omega t_1)}$$

$$Im(\chi_P(\omega)) = \frac{\chi_P(t_1)\cos(\omega t_2) - \chi_P(t_2)\cos(\omega t_1)}{\sin(\omega t_1)\cos(\omega t_2) - \sin(\omega t_1)\cos(\omega t_1)}$$

If the above-mentioned investigations are carried out with a corresponding number of different frequencies ($\omega$) of the excitation power within a defined frequency band which is of interest, the transmission function of the structure deformations can be determined.

The data obtained in this manner concerning the movement of the individual image points, that is, particularly with respect to their amplitude and their phase, relative to the excitation power of the shaker 2, therefore supplies information concerning the amplitude-related and phase-related deviation characteristics for the individual measuring points of the object 1. This information which, in the case of a normal modal analysis corresponds to the information supplied by discrete acceleration generators, will then be used by means of numerical modal-analytical investigations for the determination and analysis of the vibration characteristics of the object in a known fashion. Thus, it is possible to carry out a modal analysis without any influencing of the object by discrete signal generators. The absence of signal generators having mass also has the advantage that the structure deformation can be examined without any reaction. The density of the measuring points is subjected to no limitations. Finally, in contrast to the known modal analysis with discrete signal generators, high natural frequencies of the structure can also be determined.

What is claimed is:

1. A process for determining vibration characteristics of a body via modal analysis, the process comprising the steps of:

exciting the body at different frequencies of an excitation power so as to effect vibrations;

at one viewing angle, recording at least two optical interference images of mutually different vibration conditions of the body;

analyzing the optical interference images with a mathematical/physical model with respect to vibration characteristics existing at predetermined points on the body to compute real and imaginary parts of the vibration characteristics; and performing modal analysis on the analyzed vibration characteristics of the predetermined points.

2. The process according to claim 1, wherein the step of recording optical interference images is performed via laser techniques.

3. The process according to claim 2, wherein the optical interference images are holograms.

4. The process according to claim 2, wherein the optical interference images are obtained via Speckle interferometry.

5. The process according to claim 3, wherein said holograms are obtained via double-pulse interferometry.

6. The process according to claim 1, wherein the step of exciting the body is performed using different defined excitation frequencies.

7. The process according to claim 6, further comprising the step of changing the different defined excitation frequencies in uniform steps.

8. A process for conducting modal analysis of a body, comprising the steps of:

exciting the body at different frequencies ($\omega$) of excitation power within a defined frequency band of interest to determine a transmission function of structural deformations of the body;

recording at least two interference images of mutually different vibration conditions in order to compute real and imaginary parts of the deformations with respect to the excitation power of each image point on the body;

computing the real and imaginary parts of the deformations to obtain computed information for each image point in accordance with the following equations:

$$Re(\chi_P(\omega)) = \frac{\chi_P(t_2)\sin(\omega t_2) - \chi_P(t_1)\sin(\omega t_2)}{\sin(\omega t_1)\cos(\omega t_2) - \sin(\omega t_2)\cos(\omega t_1)}$$

-continued
$$Im(\chi_P(\omega)) = \frac{\chi_P(t_1)\cos(\omega t_2) - \chi_P(t_2)\cos(\omega t_1)}{\sin(\omega t_1)\cos(\omega t_2) - \sin(\omega t_1)\cos(\omega t_1)}$$

and determining and analyzing vibration characteristics of the body via modal analysis in a non-physically contacting manner using the computed information.

9. The process according to claim 8, wherein the real and imaginary parts of the equations represent an amplitude and phase of the vibration characteristics of each image point.

* * * * *